United States Patent [19]

Suzuki et al.

[11] Patent Number: 5,639,073
[45] Date of Patent: Jun. 17, 1997

[54] FLUID-FILLED ENGINE MOUNT HAVING ORIFICE PASSAGES FOR DAMPING DIFFERENT COMPONENTS OF ENGINE IDLING VIBRATIONS

[75] Inventors: Tatsuya Suzuki; Rentaro Kato, both of Kasugai; Tetsuo Mikasa, Wako; Shuji Ohtake, Wako; Atsushi Sakamoto, Wako, all of Japan

[73] Assignee: Tokai Rubber Industries, Ltd., Aichi-ken, Japan

[21] Appl. No.: 672,656

[22] Filed: Jun. 28, 1996

[30] Foreign Application Priority Data

Jul. 7, 1995 [JP] Japan .................... 7-172494

[51] Int. Cl.$^6$ .................... F14F 13/00; F16M 1/00
[52] U.S. Cl. .................... 267/140.13; 267/219
[58] Field of Search .................... 267/140.11, 140.13, 267/140.14, 140.15, 219; 248/550, 562, 566

[56] References Cited

U.S. PATENT DOCUMENTS

| | | | |
|---|---|---|---|
| 5,123,635 | 6/1992 | Bouhours | 248/562 |
| 5,310,169 | 5/1994 | Kojima | 267/140.14 |
| 5,397,113 | 3/1995 | Kojima et al. | 267/140.14 |
| 5,427,361 | 6/1995 | Suzuki et al. | 267/219 |

*Primary Examiner*—Robert J. Oberleitner
*Assistant Examiner*—Chris Schwartz
*Attorney, Agent, or Firm*—Parkhurst, Wendel & Burr, L.L.P.

[57] ABSTRACT

A fluid-filled elastic engine mount for a motor vehicle having an engine, comprising a first and a second mounting member which are connected by an elastic body that partially defines a pressure-receiving chamber, a flexible diaphragm member which partially defines an equilibrium chamber, and orifice means for effecting fluid communication between the pressure-receiving and equilibrium chambers. The orifice means defines a first and a second orifice passage which are respectively tuned to adjust respective different components of the idling vibrations of the engine, and a third orifice passage which is tuned to a frequency range lower than that of the engine idling vibrations. The orifice means comprises a movable member which partially defines one of the first and second orifice passages which is tuned to adjust one of the different components of the idling vibration whose frequency is higher than the other of the different components, the movable member restricting an amount of flow of fluid through one of the first and second orifice passages. The engine mount further comprises valve means for selectively enabling or disabling both of the first and said second orifice passages simultaneously for permitting or inhibiting the fluid communication between the two chambers.

10 Claims, 9 Drawing Sheets

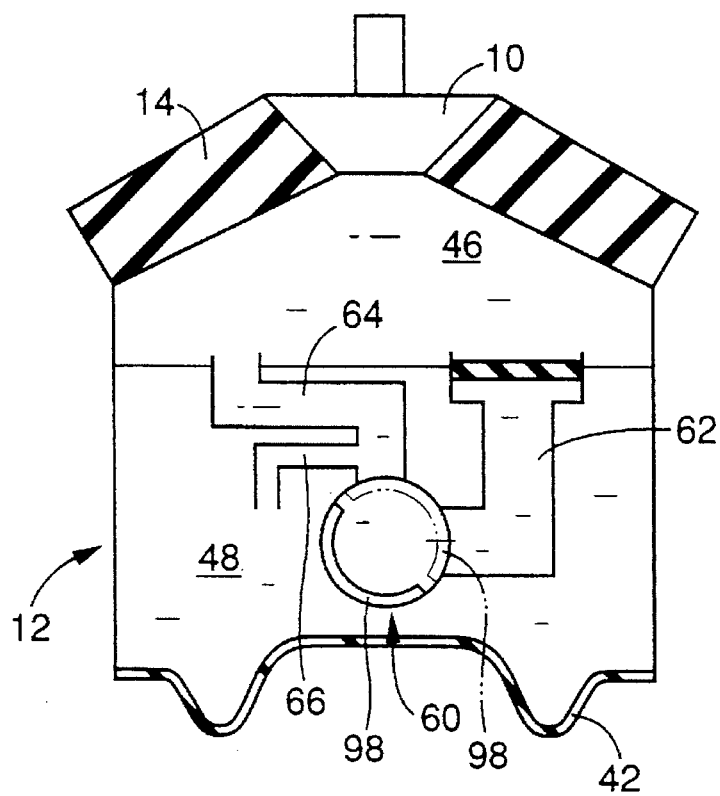
FIG. 11
FIG. 12
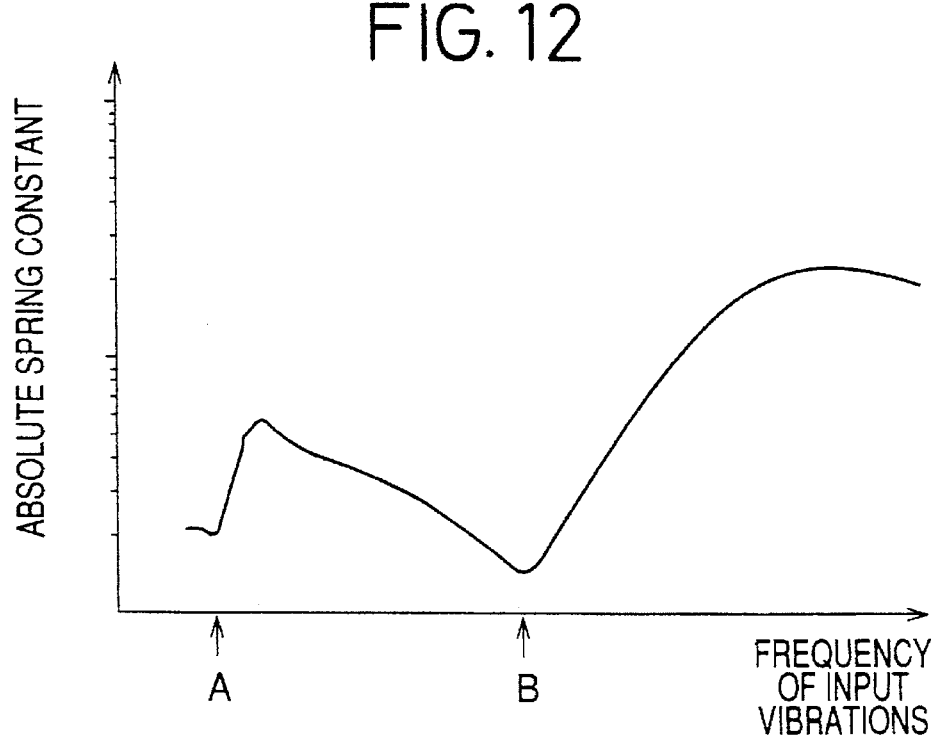

FLUID-FILLED ENGINE MOUNT HAVING ORIFICE PASSAGES FOR DAMPING DIFFERENT COMPONENTS OF ENGINE IDLING VIBRATIONS

BACKGROUND OF THE INVENTION

1. Field of the Invention

The present invention relates to a fluid-filled elastic engine mount adapted to mount a power unit of a motor vehicle on a suitable support member of the vehicle in a vibration damping manner. More particularly, the present invention is concerned with such a fluid-filled elastic engine mount having an improved constructional arrangement, which is capable of exhibiting an excellent vibration damping effect with respect to engine idling vibrations, on the basis of flows of a fluid contained therein.

2. Discussion of the Prior Art

As one type of an engine mount which is interposed between a power unit such as an internal combustion engine of a motor vehicle and a support member so as to mount or support the power unit on the support member in a vibration damping manner, there is known a fluid-filled elastic engine mount wherein a first and a second mounting member which are respectively attached to one and the other of the power unit and the support member are spaced apart from each other by a suitable distance and are elastically connected to each other by an elastic body. The engine mount has a pressure-receiving chamber which is partially defined by the elastic body, and an equilibrium chamber which is partially defined by a flexible diaphragm. These pressure-receiving and equilibrium chambers are filled with a suitable non-compressible fluid, and communicate with each other by an orifice passage. A pressure of the fluid in the pressure-receiving chamber changes due to elastic deformation of the elastic body upon application of vibrations to the engine mount, while a volume of the equilibrium chamber is easily variable by displacement of the flexible diaphragm. This type of fluid-filled elastic engine mount is capable of exhibiting a high damping and isolating effect with respect to vibrations applied between the first and second mounting members, based on flows or resonance of the fluid which is forced to flow through the orifice. For this reason, the elastic mount of this type is favorably used as an engine mount for a motor vehicle, for example.

Generally, an engine mount is required to exhibit different damping or isolating characteristics depending on the type of the input vibrations having different frequencies and amplitudes. For instance, the engine mount for the motor vehicle is especially required to exhibit damping effects with respect to medium-frequency vibrations of several tens of Hz such as engine idling vibrations applied to the engine mount during idling of the vehicle while the vehicle is in a stop with the engine in an idling state, and with respect to low-frequency vibrations of about 10 Hz such as engine shakes applied to the engine mount during running of the vehicle. To meet the above requirement, the conventional engine mount is provided with two orifices between the pressure-receiving and equilibrium chambers, one of which is tuned to a medium frequency range corresponding to the engine idling vibrations and the other of which is tuned to a low frequency range corresponding to the engine shakes.

In view of a recently increasing requirement for improved smooth running stability of the vehicles, there has been an increasing demand for further improved damping or isolating characteristics of the engine mount. In particular, the engine mount is required to exhibit significantly improved damping or isolating characteristics with respect to the engine idling vibrations in order to minimize the vibrations and noise while the vehicle is stationary with the engine placed in its idling state.

SUMMARY OF THE INVENTION

The present invention was developed in the light of the above situation. It is therefore an object of the invention to provide a fluid-filled elastic engine mount which exhibits considerably improved damping effects with respect to the idling vibrations while assuring sufficient damping effects with respect to the low-frequency vibrations such as engine shakes.

The above object may be achieved according to the principle of the present invention, which provides a fluid-filled elastic mount for a motor vehicle having an engine, comprising: a first and a second mounting member which are spaced apart from each other; an elastic body which elastically connects the first and second mounting members and which partially defines a pressure-receiving chamber which is filled with a non-compressible fluid and whose pressure changes upon application of a vibrational load to the engine mount; a flexible diaphragm member which partially defines an equilibrium chamber filled with the fluid, the flexible diaphragm member being displaceable to permit a change in a volume of the equilibrium chamber; orifice means for effecting fluid communication between the pressure-receiving and the equilibrium chambers; the orifice means defining a first orifice passage and a second orifice passage which are respectively tuned to adjust respective different components of idling vibrations of the engine, and a third orifice passage which is tuned to a frequency range which is lower than that of the idling vibrations of the engine; the orifice means comprising a movable member which partially defines one of the first and second orifice passages which is tuned to adjust one of the different components of the idling vibration whose frequency is higher than the other of the different components, the movable member restricting an amount of flow of fluid through one of the first and second orifice passages; and valve means for selectively enabling or disabling both of the first and said second orifice passages simultaneously for permitting or inhibiting the fluid communication between the pressure-receiving and the equilibrium chambers.

In the conventional engine mount, the orifice passage is tuned so that the engine mount exhibits a desired damping characteristic with respect to the engine idling vibration in a specific frequency range in which the vibration level is the highest. In other words, the conventional engine mount is designed so as to adjust or damp exclusively the component of the engine idling vibration whose vibration level is the highest. However, a study made by the inventors of the present invention revealed that the conventional engine mount designed as described above is not satisfactory in order to meet the demand for highly improved damping characteristics with respect to the engine idling vibrations, for satisfying the requirement for improved running stability of the vehicle. Further, it was found that the engine mount is required to exhibit the vibration damping capability with respect to different components of the input vibrations which may arise depending on the engine type of the vehicle, as well as the component whose vibration level is the highest.

The present invention was made based on the above finding. The fluid-filled elastic engine mount constructed according to the present invention is capable of adjusting or damping not only the component of the engine idling vibrations whose vibration level is the highest, but also the other component or components, to thereby exhibit a considerably high damping effect over a wider frequency range of the engine idling vibrations, based on the fluid flows through the first and second orifice passages.

The different components of the engine idling vibration correspond to different ratios of the vibration frequency with respect to the rotating speed of the crankshaft of the engine. Preferably, the first and second orifice passages are tuned to adjust the respective different components of the engine idling vibrations whose vibration levels are the highest and the second highest. More specifically described, the first and second orifice passages are desirably tuned to adjust the second-order component and the first- or fourth-order component of the idling vibrations generated by an in-line 4-cylinder engine, or the third-order component and the 1.5 th- or sixth-order component of the idling vibrations generated by a v-type 6-cylinder engine. The tuning of the orifice passages may be advantageously effected by adjusting the length and cross sectional area of each orifice so as to permit the engine mount to exhibit a low dynamic spring constant in the intended frequency ranges of the input vibrations to be damped based on resonance of the fluid flowing through the orifice passages while taking account of the spring stiffness of the wall of elastic body which partially defines the pressure-receiving chamber, and the specific gravity of the fluid contained in the fluid chambers.

In general, when a plurality of orifice passages are formed in parallel with each other within the elastic mount, one of the orifice passages which is tuned to damp the vibrations of relatively high frequencies has a lower resistance to the fluid flows than the other orifice passage and therefore, the amount of flow of the fluid through the other orifice passage which is tuned to damp the vibrations of relatively low frequencies tends to be insufficient. In the present fluid-filled elastic engine mount, however, the amount of flow of the fluid through one of the first and second orifice passages which is tuned to the relatively high frequency vibrations is restricted by the movable member, to thereby assure a sufficient amount of flow of the fluid through the other orifice passage which is tuned to the relatively low frequency vibrations, so that the engine mount exhibits the desired damping characteristics.

When the first and second orifice passages are both disabled for inhibiting the fluid flows therethrough, the present fluid-filled elastic engine mount exhibits effective damping characteristics with respect to the vibrations in the low-frequency range such as engine shakes, based on resonance of the fluid flows through the third orifice passage, which is tuned to the vibrations whose frequency is lower than that of the engine idling vibrations.

According to a first preferred form of the present invention, wherein the orifice means further comprises: a partition member which is supported by the second mounting member and which partially defines the pressure-receiving and equilibrium chambers on opposite sides thereof, respectively, the partition member having grooves open in an upper surface of the partition member; and a partition plate placed on the upper surface of the partition member so as to close openings of the grooves, for providing the second and third orifice passages, respectively, and wherein the first orifice passage is formed through the partition member and is open at one end thereof in the upper surface of the partition member, the movable plate defining an end portion of the first orifice passage which is open in the upper surface of the partition member.

In the first preferred form of the present invention, the first, second and third orifice passages having different lengths can be easily formed with a simple structure. Thus, the present fluid-filled elastic engine mount advantageously has a high degree of freedom in tuning the first, second and third orifice passages.

According to a second preferred form of the present invention, wherein the partition member has a valve hole formed in a central portion thereof, and the valve means comprises a rotary valve which is disposed within the valve hole such that an axis of the rotary valve extends in a radial direction perpendicular to an axial direction in which the pressure-receiving and equilibrium chambers are spaced from each other, the end portion of the first orifice passage being offset from the central portion of the partition member in the radial direction.

In the second preferred form of the present invention, the first orifice passage can be formed within a radial portion of the partition member located on one side of the rotary valve such that the first orifice passage extends in the circumferential direction of the partition member. In this arrangement, the rotary valve as the valve means is advantageously positioned in the elastic mount while assuring a sufficient length of the first orifice passage without considerably increasing the thickness of the partition member.

According to a third preferred form of the present invention, wherein the third orifice passage is connected at one end thereof to the second orifice passage, so that the third orifice passage is held in communication with the pressure-receiving and equilibrium chambers via the second orifice passage.

In the third preferred form of the present invention, the second orifice passage is connected in series with the third orifice passage. In this arrangement, the third orifice passage need not be open at one end thereof in one of the opposite surfaces of the partition member, to thereby reduce a space required for forming the third orifice passage.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which:

FIG. 11 is a view schematically showing a construction of the engine mount of FIG. 1;

FIG. 12 is a graph showing a relationship between the absolute spring constant of the engine mount of FIG. 1 and the frequency of vibrations applied to the engine mount;

DETAILED DESCRIPTION OF PREFERRED EMBODIMENT

Figure 1:
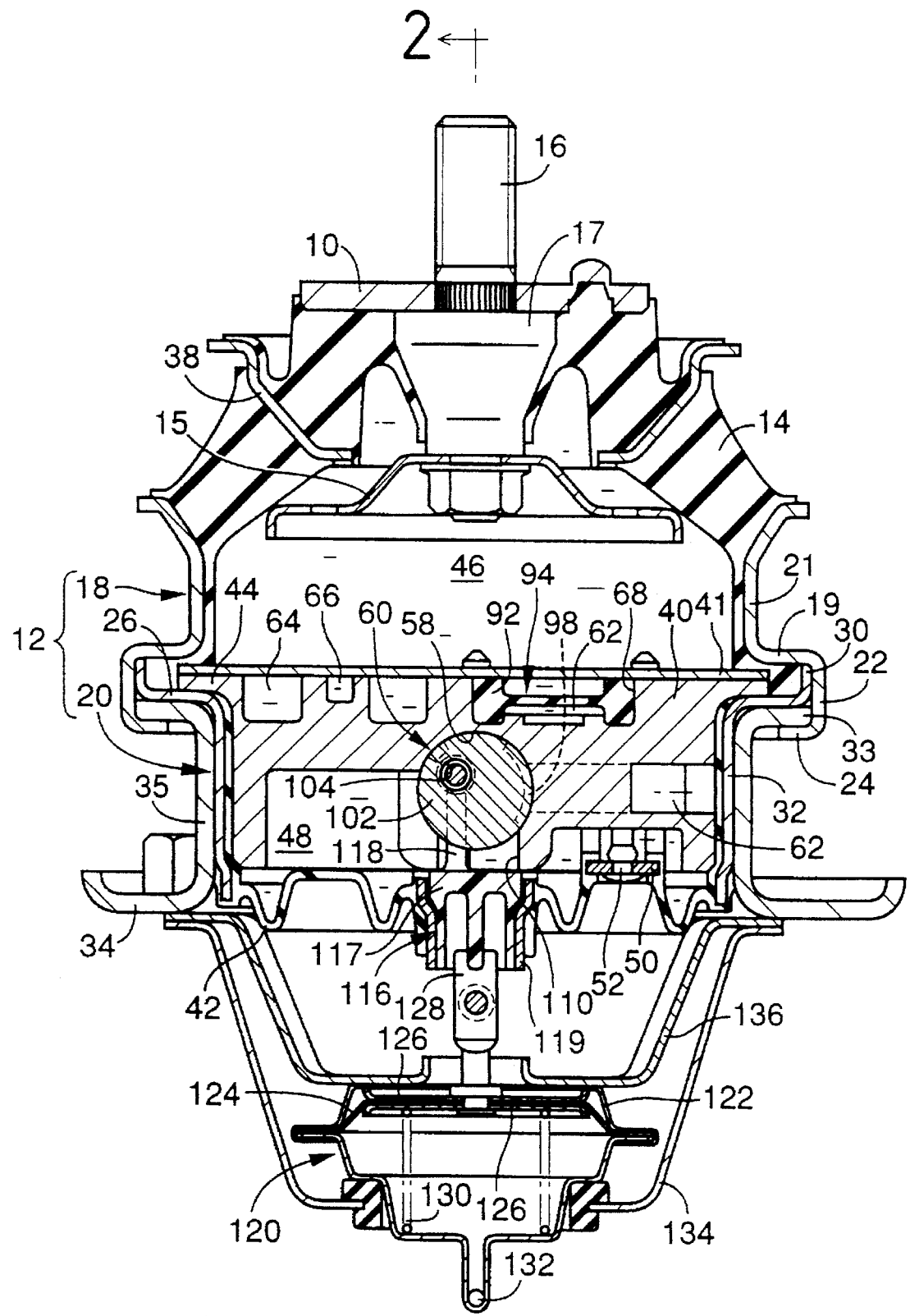
FIG. 1 is an elevational view in longitudinal cross section of an engine mount for use on a motor vehicle constructed according to one embodiment of the present invention, taken along line 1—1 of FIG. 2.
Figure 2:
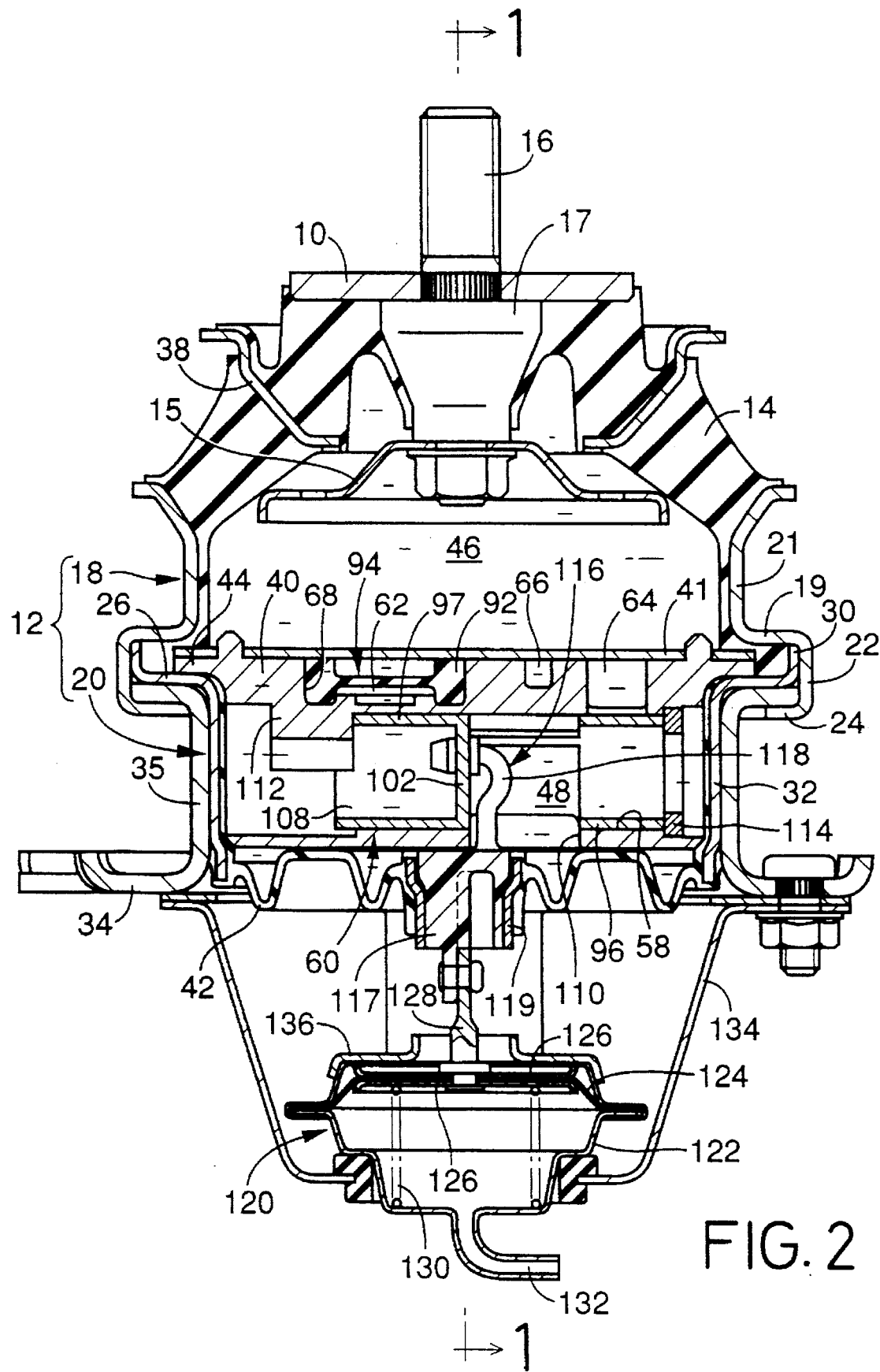
FIG. 2 is an elevational view in longitudinal cross section of the engine mount, taken along line 2—2 of FIG. 1.

Referring first to FIGS. 1 and 2, there is shown an engine mount for use on a motor vehicle, which is constructed according to one embodiment of the present invention. The engine mount includes a first mounting member 10 made of a metallic material, a second mounting member 12 also made of a metallic material, and an elastic body 14 which is interposed between the first and second mounting members 10, 12 so as to elastically connect these mounting members 10, 12. This engine mount is interposed between a power unit and a body of the vehicle such that the first mounting member 10 is attached to one of the power unit and the vehicle body, while the second mounting member 12 is attached to the other of the power unit and the vehicle body. Thus, the power unit is mounted on the vehicle body via the present engine mount in a vibration damping or isolating manner. When the present engine mount is installed on the vehicle as described above, a load or weight of the power unit acts on the elastic body 14, and the elastic body 14 is elastically deformed, whereby the first and second mounting members 10, 12 are displaced toward each other by a suitable relative distance in the axial direction of the engine mount, i.e., in the vertical direction as seen in FIGS. 1 and 2. This direction will be referred to as "load-receiving direction" where appropriate.

The first mounting member 10 has a generally circular disk shape. A mounting bolt 16 is secured to a central portion of the first mounting member 10 so as to extend therethrough in the axially upward direction of the engine mount. The first mounting member 10 is attached to one of the power unit and the vehicle body through the mounting bolt 16. The mounting bolt 16 has a head portion 17 which has a substantially inverted frustoconical shape and extends from the first mounting member 10 in the axially downward direction of the engine mount. To the end of the head portion 17 of the mounting bolt 16, there is secured a hat-shaped member 15 which has a generally circular shape and extends from the head portion 17 radially outwardly of the engine mount in a direction substantially perpendicular to the load-receiving direction.

The second mounting member 12 consists of an upper sleeve 18 and a lower sleeve 20 each having a generally cylindrical shape. The upper sleeve 18 has a shoulder 19 at an axially intermediate portion thereof, and includes a small-diameter portion 21 on the upper side of the shoulder 19 and a large-diameter portion 22 on the lower side of the shoulder 19. The large-diameter portion 22 has a calking part 24 at a lower open end of the upper sleeve 18. The lower sleeve 20 has a shoulder 26 at an axially intermediate portion thereof, and includes a large-diameter portion 30 on the upper side of the shoulder 26 and a small-diameter portion 32 on the lower side of the shoulder 26. The upper sleeve 18 and the lower sleeve 20 are fixed to each other such that the large-diameter portion 30 of the lower sleeve 20 is accommodated in the large-diameter portion 22 of the upper sleeve 18 and calked to the upper sleeve 18 by the calking part 24, together with an upper flange 33 of a cylindrical bracket 35 which will be described. Thus, the upper and lower sleeves 18, 20 are superposed on and connected to each other in the axial direction thereof, so as to form the second mounting member 12 which has a generally cylindrical shape.

On the outer circumferential surface of the lower sleeve 20, there is fixed the cylindrical bracket 35 having the upper flange 33 and a lower flange 34 which are respectively formed at the axially opposite open ends thereof such that the upper and lower flanges 33, 34 extend radially outwardly of the bracket 35. The bracket 35 is secured to the second mounting member 12 such that the upper flange 33 is in contact with the shoulder 26 of the lower sleeve 20 and such that the upper flange 33 is calked to the calking part 24 of the upper sleeve 18, together with the shoulder 26. The lower flange 34 of the bracket 35 is secured by means of a bolt to one of the power unit and the vehicle body, so that the second mounting member 12 is attached to the power unit or the vehicle body via the bracket 35.

The first mounting member 10 is disposed with a suitable axial distance away from the upper open end of the second mounting member 12 on the side of the upper sleeve 18, and the elastic body 14 is interposed between the first and second mounting members 10, 12. The elastic body 14 has a generally tapered shape in cross section, with a relatively large wall thickness, as shown in FIGS. 1 and 2. When the elastic body 14 is formed in a vulcanization process, the outer circumferential surface of the large-diameter end of the elastic body 14 is bonded to the inner circumferential surface of the open end portion of the upper sleeve 18 of the second mounting member 12, while the inner circumferential surface of the small-diameter end of the elastic body 14 is bonded to the lower or inner surface of the first mounting member 10 and the outer circumferential surface of the head portion 17 of the bolt 16. Thus, the elastic body 14 fluid-tightly closes the open end of the upper sleeve 18 of the second mounting member 12. It is noted that the spring characteristic of the elastic body 14 is adjusted by an annular or cylindrical ring member 38 which is embedded in an axially intermediate portion of the elastic body 14.

Within the second mounting member 12, there are disposed a partition member 40 and a circular partition plate 41 which are superposed on each other in the axial direction. The partition member 40 is a generally cylindrical member or a disk member with a relatively large thickness (height dimension in the axial direction of the engine mount). The partition plate 41 as a covering member is superposed on the upper surface of the the partition member 40 as seen in FIGS. 1 and 2. The partition member 40 has a flange portion 44 at its axial upper end (as seen in FIGS. 1 and 2) so as to extend radially outwardly. The partition member 40 is calked with respect to the second mounting member 12 such that the flange portion 44 of the partition member 40 is gripped by and between the shoulder 26 of the lower sleeve 20 and the shoulder 19 of the upper sleeve 18, together with the outer peripheral portion of the partition plate 41. On the lower open end of the second mounting member 12 on the side of the lower sleeve 20, there is disposed a diaphragm 42, which is a substantially circular thin-walled flexible rubber layer. The peripheral portion of the diaphragm 42 is bonded by vulcanization to the open end of the lower sleeve 20 of the second mounting member 12, whereby the lower open end of the second mounting member 12 on the side of the lower sleeve 20 is fluid-tightly closed by the diaphragm 42.

Thus, the axially opposite open ends of the second mounting member 12 are fluid-tightly closed by the elastic body 14 and the diaphragm 42, so that the second mounting member 12 cooperates with the elastic body 14 and the diaphragm 42 to define a fluid-tight space. This space is divided by the partition member 40 into a pressure-receiving chamber 46 and an equilibrium chamber 48, which are located on the opposite sides of the partition member 40. That is, the pressure-receiving chamber 46 is partially defined by the elastic body 14, while the equilibrium chamber 48 is partially defined by the diaphragm 42. These pressure-receiving and equilibrium chambers 46, 48 are filled with a suitable non-compressible fluid such as water, alkylene glycol, polyalkylene glycol, or silicone oil. For effective damping of input vibrations based on resonance of the fluid, it is preferable to fill the pressure-receiving and equilibrium chambers 46, 48 with a low-viscosity fluid whose viscosity is not higher than 0.1 Pa.s. The chambers 46, 48 are filled with the selected fluid, by injecting the fluid into these chambers through a hole formed through a disk 50 which is bonded to the diaphragm 42 such that the hole communicates with the equilibrium chamber 48. After the chambers 46, 48 are filled with the fluid, the hole in the disk 50 is closed by a rivet 52.

The hat-shaped member 15 which is supported by the first mounting member 10 via the head portion 17 of the mounting bolt 16 is disposed within the pressure-receiving chamber 46. When the present engine mount is installed on the vehicle, the elastic body 14 is deformed by the weight of the power unit, whereby the hat-shaped member 15 is axially displaced toward the second mounting member 12 so as to form an annular restricted fluid passage between the periphery of the hat-shaped member 15 and the corresponding portion of the inner circumferential surface of the pressure-receiving chamber 46 (elastic body 14). This engine mount exhibits a sufficiently low dynamic spring constant with respect to high-frequency vibrations such as booming noise generated during medium- or high-speed running of the vehicle, based on resonance of the fluid which is forced to flow through the above-indicated restricted fluid passage upon application of such high-frequency vibrations to the engine mount.

The partition member 40 which divides the above-indicated fluid-tight space into the pressure-receiving and equilibrium chambers 46, 48 has a valve hole 58 having a circular cross section as seen in FIG. 1. The valve hole 58 has an axis which extends in a radial (diametrical) direction of the second mounting member 12 perpendicular to the axis of the second mounting member 12 (i.e., perpendicular to a direction in which the pressure-receiving and equilibrium chambers 46, 48 are opposed to each other). Within the valve hole 58, there is disposed a rotary valve 60 such that it is rotatable about a center axis thereof. The partition member 40 further has a first, a second and a third orifice passage 62, 64, 66 formed therethrough for fluid communication between the pressure-receiving chamber 46 and the equilibrium chamber 48. The open ends of the first and second orifice passages 62, 64 on the side of the equilibrium chamber 48 are exposed on a sliding surface of the valve hole 58. In operation of the rotary valve 60, the first and second orifice passages 62, 64 are simultaneously controlled to be selectively enabled and disabled for permitting and inhibiting the fluid communication with the equilibrium chamber 48.

More specifically described by reference to FIGS. 3–6, the partition member 40 has a circular recess 68 formed and open in a portion of its upper surface (as seen if FIGS. 1 and 2), which portion is offset from the center of the partition member 40 by a suitable radial distance. The partition member 40 also has a first groove 74 which extends in a circumferential direction of the partition member 40 and which communicates at one end thereof with the circular recess 68 through a communication hole 70 and at the other end with the valve hole 58 through a communication hole 72. The partition member 40 further has a second and a third groove 76, 78 which is formed in a curved or serpentine pattern in a portion of the upper surface of the partition member 40 in which the circular recess 68 is not formed. The second groove 76 communicates at one end thereof with the valve hole 58 through a communication hole 80. The third groove 78 is connected at one end thereof to the above-indicated one end of the second groove 76 communicating with the communication hole 80. The third groove 78 is open at the other end in the lower surface of the partition member 40 through a communication hole 82.

Figure 3:
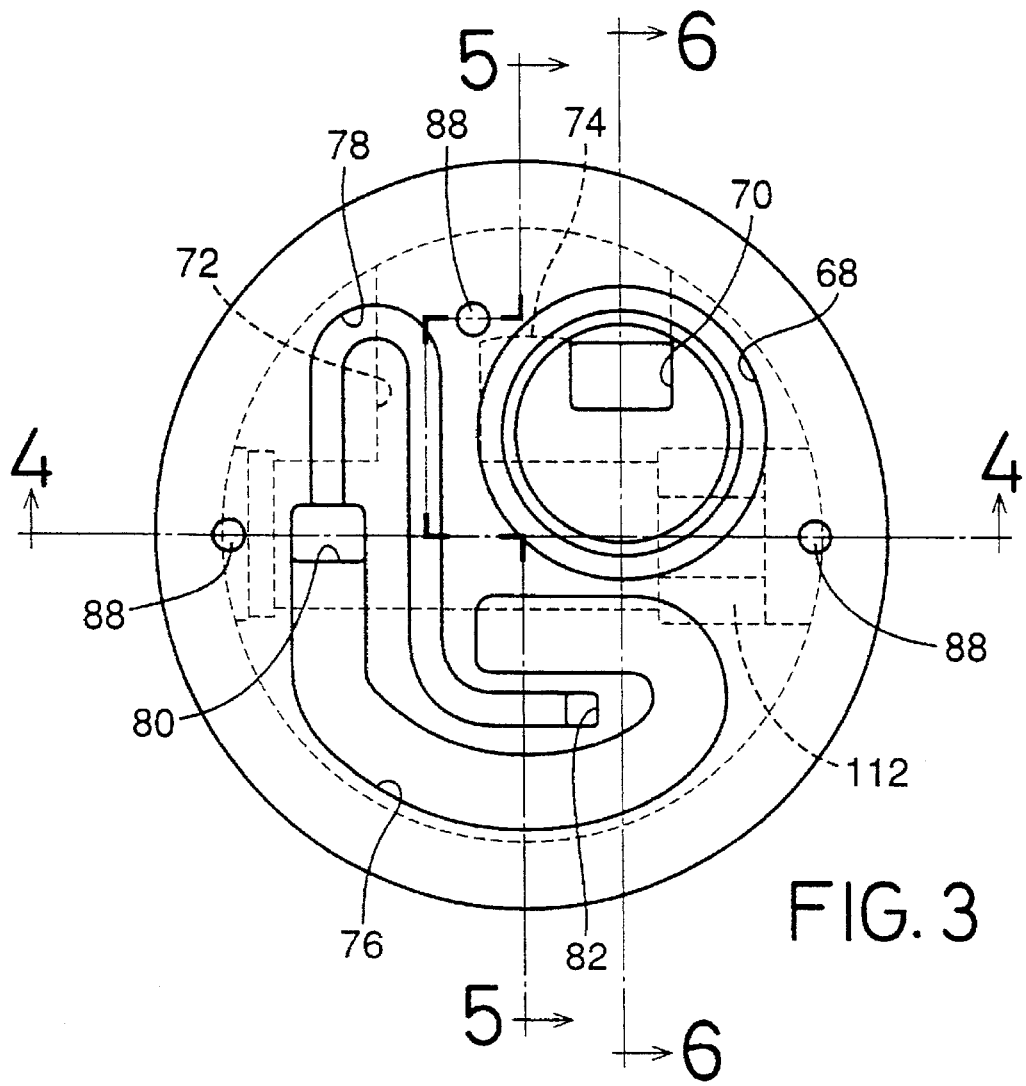
FIG. 3 is a plan view of a partition member used in the engine mount of FIG. 1.
Figure 4:
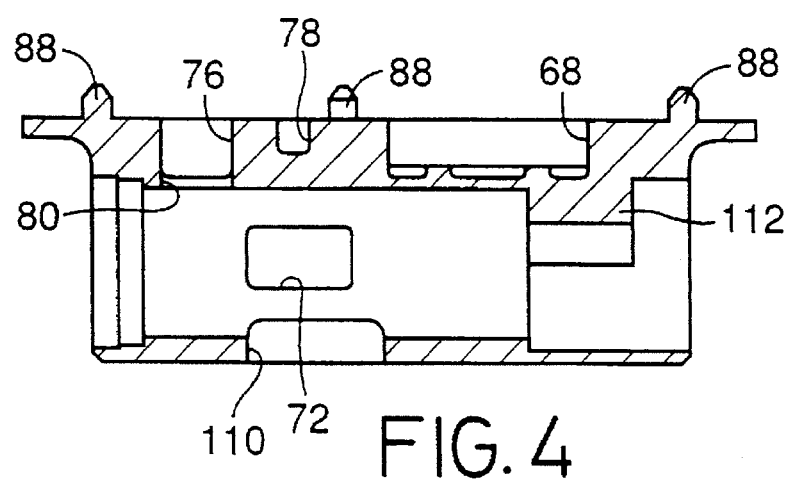
FIG. 4 is a cross sectional view taken along line 4—4 of FIG. 3.
Figure 5:
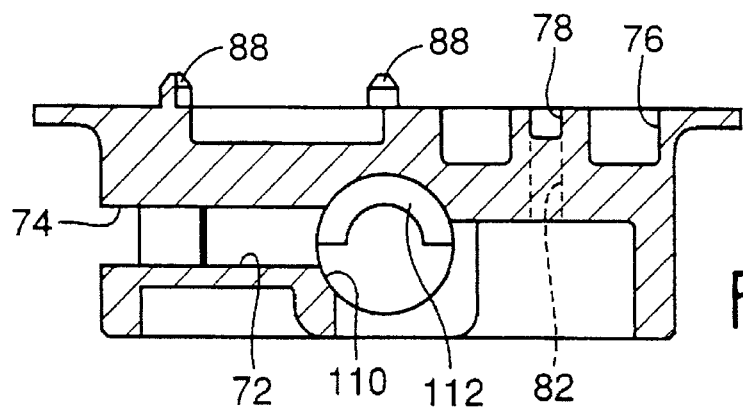
FIG. 5 is a cross sectional view taken along line 5—5 of FIG. 3.
Figure 6:
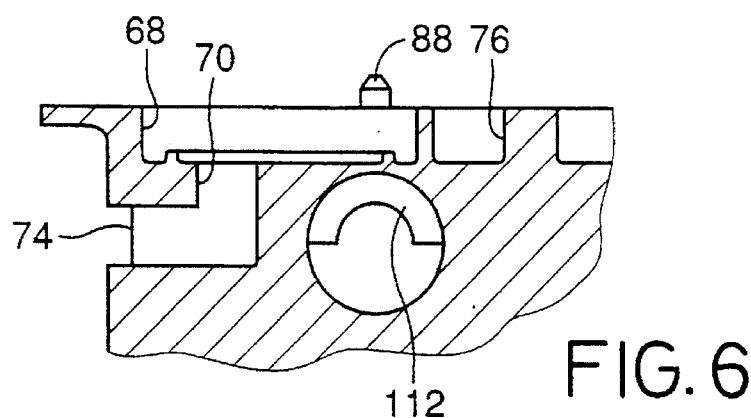
FIG. 6 is a cross sectional view taken along line 6—6 of FIG. 3.
Figure 7:
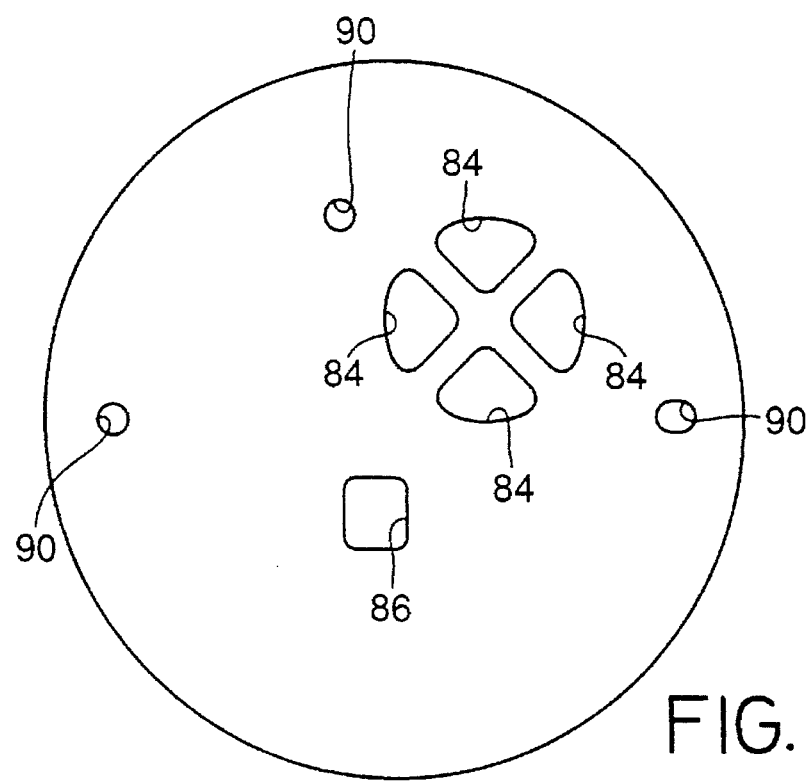
FIG. 7 is a plan view showing a partition plate used in the engine mount of FIG. 1.

As shown in FIG. 7, the partition plate 41 superposed on the upper surface of the partition member 40 has four through-holes 84 communicating with the circular recess 68 of the partition member 40, and a communication hole 86 communicating with the other end of the second groove 76 remote from the communication hole 80. The partition member 40 has three positioning pins 88 formed on its outer circumferential portion so as to extend upwardly from the upper surface of the partition member 40, as shown in FIGS. 3 and 4. The partition plate 41 has three positioning holes 90 which engage with the respective positioning pins 88, so that the partition member 40 and the partition plate 41 are positioned relative to each other.

Referring back to FIGS. 1 and 2, within the circular recess 68 of the partition member 40, there is accommodated a substantially disk-like, flexible rubber layer 94 as a movable or deformable member. This rubber layer 94 has a thick-walled, annular fixing portion 92 which is integrally formed along the outer circumference of the rubber layer 94. The rubber layer 94 is fixed to the partition member 40 such that the fixing portion 92 engages with an annular bottom groove, which is formed in the bottom surface of the circular recess 68 around its outer circumference and such that the fixing portion 92 is gripped by and between the bottom groove of the recess 68 and the partition plate 41, to thereby permit a central portion of the rubber layer 94 to be elastically deformed.

In the thus constructed partition member 40, the first groove 74 is closed by the lower sleeve 20 of the second mounting member 12, so as to provide the first orifice passage 62 for fluid communication with the pressure-receiving chamber 46 and the equilibrium chamber 48 via the rotary valve 60. Namely, the first orifice passage 62 substantially communicates with the pressure-receiving chamber 46 through the circular recess 68 and communication hole 70, and with the equilibrium chamber 48 through the communication hole 72. Although this first orifice passage 62 does not actually communicate with the pressure-receiving chamber 46 in the presence of the flexible rubber layer 94, the rubber layer 94 which is elastically deformable permits fluid oscillation in the first orifice passage 62. In this respect, the first orifice passage 62 is considered to effect the fluid communication between the pressure-receiving chamber 46 and the equilibrium chamber 48 if the rotary valve 60 is open. With the partition plate 41 superposed on the upper surface of the partition member 40, the second groove 76 and the third groove 78 are closed at their upper openings by the partition plate 41. Accordingly, the second groove 76 defines the second orifice passage 64 which communicates with the pressure-receiving chamber 46 and the equilibrium chamber 48 through the communication hole 86 of the partition plate 41 and the communication hole 80 of the partition member 40, respectively. Further, the third groove 78 defines the third orifice passage 66 which is connected at one end thereof to the second orifice passage 64 and which communicates with the pressure-receiving and equilibrium chambers 46, 48 through the second orifice passage 64 and the communication hole 82, respectively.

The cross sectional area and length of each of the first and second orifice passage 62, 64 are tuned or determined so that the engine mount exhibits sufficiently high damping effects with respect to so-called engine idling vibrations applied to the engine mount while the vehicle is in a stop with the engine idling. In other words, the first and second orifice passages 62, 64 are tuned so as to permit the engine mount to effectively exhibit sufficiently low spring constants based on resonance of the fluid flowing through these orifices 62, 64 upon application of the engine idling vibrations to the engine mount. This tuning of the passages 62, 64 is effected while taking account of spring stiffness of the wall of the elastic body 14 which partially defines the pressure-receiving chamber 46.

In the present invention, the engine idling vibrations means not only the component whose vibration level is the highest (e.g., the second-order component generated during idling of an in-line 4-cylinder engine or the third-order component generated during idling of a V-type 6-cylinder engine), for which the conventional engine exhibits the effective damping characteristic, but also the other components (in particular, the first- and fourth-order components generated during idling of the in-line 4-cylinder engine, or the 1.5 th- and sixth-order components generated during idling of the V-type 6-cylinder engine). The first and second orifice passages 62, 64 in the present embodiment are respectively tuned so as to damp the engine idling vibrations including different order components. In particular, in the present embodiment, the first orifice passage 62 has a higher A/L ratio than the second orifice passage 64, where "A" and "L" represent the cross sectional area and length of each orifice 62, 64. That is, the first orifice passage 62 is tuned so as to exhibit a low dynamic spring constant based on resonance of the fluid flowing therethrough, with respect to relatively high-order components of the engine idling vibrations while the second orifice passage 64 is tuned to exhibit a low dynamic spring constant with respect to relatively low-order components of the engine idling vibrations.

The third orifice passage 66 connected in series with the second orifice passage 64 has a lower A/L ratio than the second orifice passage 64 (where "A" and "L" respectively represent the cross sectional area and length of each orifice passage 64, 66). That is, the third orifice passage 66 is tuned to exhibit a damping or isolating effect with respect to low-frequency vibrations such as engine shakes whose frequency range is lower than that of the engine idling vibrations, based on the resonance of the fluid which is forced to flow through the second and third orifice passages 64, 66 which are connected in series.

As described above, the flexible rubber layer 94 permits substantial fluid oscillation in the first orifice passage 62 or substantial fluid flow through the first orifice passage 62 owing to the elastic deformation or displacement of the rubber layer 94, while the elasticity of this rubber layer 94 restricts the amount of flow of the fluid through the first orifice passage 62. When the first and second orifice passages 62, 64 are both open for allowing the fluid communication between the pressure-receiving and equilibrium chambers 46, 48, the amount of flow of the fluid through the first orifice passage 62 which has the higher A/L ratio than the second orifice passage 64 and has a lower fluid flow resistance than the second orifice passage 64 is restricted by the rubber layer 94. This arrangement effectively assures a sufficient amount of flow of the fluid through the second orifice passage 64. Thus, the engine mount effectively exhibits sufficiently low dynamic spring constants on the basis of resonance of the fluid flowing through the first and second orifice passages 62, 64.

Figure 8:
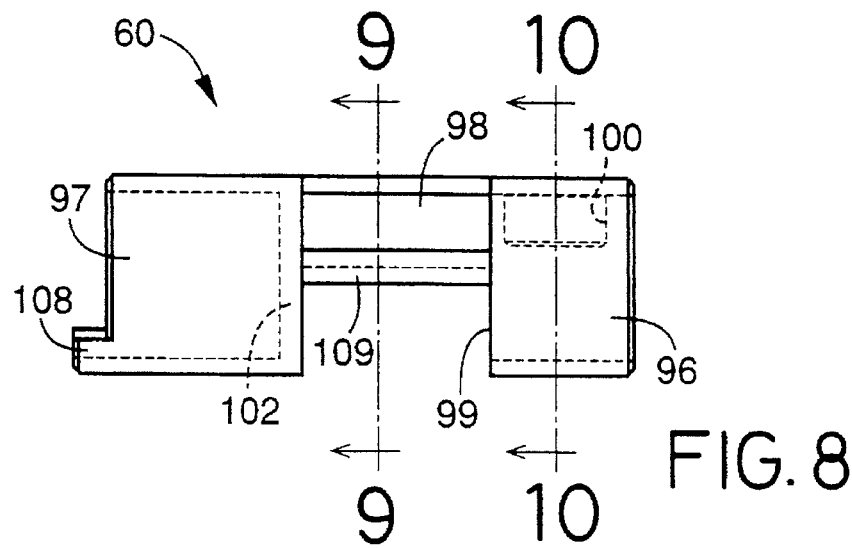
FIG. 8 is a front view of a rotary valve used in the engine mount of FIG. 1.
Figure 9:
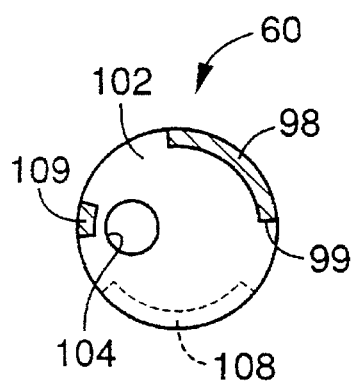
FIG. 9 is a cross sectional view taken along line 9—9 of FIG. 8.
Figure 10:
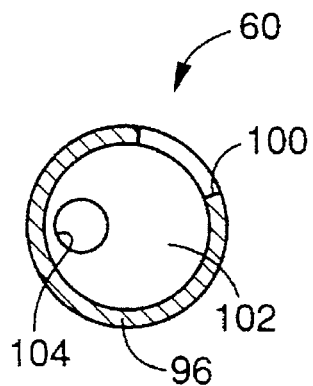
FIG. 10 is a cross sectional view taken along line 10—10 of FIG. 8.

The ends of the first and second orifice passages 62, 64 on the side of the equilibrium chamber 48 (i.e., the communication holes 72, 80) are open on the side and upper portions of the sliding surface of the valve hole 58, respectively, and communicate with the equilibrium chamber 48 through the rotary valve 60. Described more specifically by reference to FIGS. 8–10, the rotary valve 60 includes a first and a second cylindrical bearing portion 96, 97 formed on the axially opposite ends thereof, and an intermediate arcuate valve portion 98 which extends in the axial direction and connects the first and second cylindrical bearing portions 96, 97. The arc of the valve portion 98 corresponds to about one-fourth of the entire circumference of the first and second cylindrical bearing portions 96, 97. The rotary valve 60 has a generally cylindrical shape, having an axially intermediate section between the first and second cylindrical bearing portions 96, 97. The axially intermediate section has a cutout 99 which corresponds to about three-quarters of the circumference of the first and second cylindrical bearing portions 96, 97. The inside space of the rotary valve 60 is open in its outer circumferential surface through the cutout 99. As shown in FIG. 8, the first cylindrical bearing portion 96 has a communication hole 100 formed through the wall thickness thereof, while the second cylindrical bearing portion 97 has a circular drive disk 102 at one open end thereof on the side of the axially intermediate section. The drive disk 102 has an engagement hole 104 which is offset from the center of the drive disk 102 by a suitable radial distance as shown in FIGS. 9 and 10. The cylindrical bearing portion 97 also has an arcuate positioning projection 108 at the other open end thereof. The positioning projection 108 has a circumferential length corresponding to one-third of the entire circumference of the cylindrical bearing portion 97, and extends axially outwardly of the cylindrical bearing portion 97. In FIG. 8, the reference numeral 109 denotes a reinforcing portion with a relatively small circumferential length. This reinforcing portion 109 extends between the first and second cylindrical bearing portions 96, 97 in the axial direction and which is spaced apart from the arcuate valve portion 98 by a suitable circumferential distance.

The valve hole 58 of the partition member 40 in which the rotary valve 60 is rotatably accommodated is open downwards at an axially intermediate portion, and communicates with the equilibrium chamber 48 through a window 110 formed in the partition member 40, as shown in FIGS. 3–6. The partition member 40 has an arcuate abutting projection 112 formed on one of opposite ends of the valve hole 58. The abutting projection 112 extends along about one half of the circumference of the valve hole 58, with a suitable radial dimension from the edge of the corresponding end wall of the valve hole 58. The rotary valve 60 accommodated in the valve hole 58 as shown in FIGS. 1 and 2 has two operating positions (angular positions) which are defined by abutting contact of the opposite circumferential end faces of the positioning projection 108 of the rotary valve 60 with the the opposite circumferential end faces of the abutting projection 112. With the rotary valve 60 placed in one of these two operating positions, the open ends of the first and second orifice passages 62, 64 on the side of the equilibrium chamber 48 (i.e., the communication holes 72, 80) are closed by the valve portion 98 and the first cylindrical bearing portion 96, respectively. In the other operating position of the rotary valve 60, those open ends of the first and second orifice passages 62, 64 on the side of the equilibrium chamber 48 (i.e., the communication holes 72, 80) are held in communication with the equilibrium chamber 48 through the cutout 99 and the communication hole 100, respectively. As shown in FIG. 2, an annular retainer ring 114 is press-fitted at the axial end of the valve hole 58 on the side of the first cylindrical bearing portion 96, so that the rotary valve 60 is positioned relative to the valve hole 58 in the axial direction.

The rotary valve 60 is connected to a transmitting member 116 for receiving a drive force from an actuator 120 which will be described, so that the rotary valve 60 is operated or rotated. More specifically described, the transmitting member 116 includes a base portion 117 having a generally cylindrical shape and a rod 118 extending from the base portion 117 in the upward direction. The base portion 117 is fluid-tightly fixed within a metal sleeve 119 which is bonded by vulcanization to a central portion of the diaphragm 42, so that the rod 118 extends into the equilibrium chamber 48 through the central portion of the diaphragm 42, the window 110 of the partition member 40, and the cutout 99 of the rotary valve 60. The head portion of the rod 118 is inserted into and engaged with the engagement hole 104 formed in the drive disk 102, whereby the rod 118 is pivotably connected at its head portion to the rotary valve 60.

Below the transmitting member 116 which is formed through the central portion of the diaphragm 42, there is disposed the actuator 120. That is, the actuator 120 is located on one side of the diaphragm 42 remote from the equilibrium chamber 48. This actuator 120 is a known pneumatically operated diaphragm type, wherein an interior space of a housing 122 is divided into two chambers by a rubber film 124. A central portion of the rubber film 124 is sandwiched by a pair of plates 126, 126. As shown in FIGS. 1 and 2, there is secured an output rod 128 to one of the plates 126. The output rod 128 extends through one of the two chambers of the interior space of the housing 122 which is on the side of the transmitting member 116, namely, through the upper chamber as seen in FIGS. 1 and 2, and projects upwards from the housing 122. In the other or lower chamber in the housing 122, there is accommodated a coil spring 130 which biases the output rod 128 in the upward direction via the pair of plates 126, 126, so as to place the output rod 128 in an upper position thereof. The lower chamber is connected to an air conduit 132 through which a negative pressure is applied to the lower chamber, so that the output rod 128 is moved downwards as seen in FIGS. 1 and 2 to a lower position thereof against the biasing force of the coil spring 130.

The actuator 120 is fixedly attached to the lower sleeve 20 of the second mounting member 12, such that the actuator 120 is held by and between a cup-shaped lower support member 134 bolted to the lower flange 34 of the bracket 35, and an upper support plate member 136, as shown in FIG. 1. The output rod 128 projecting upwards from the top wall of the housing 122 of the actuator 120 extends toward the diaphragm 42, and is fixed to the base portion 117 of the transmitting member 116 by means of a pin. When no negative pressure is applied to the lower chamber of the actuator 120, the output rod 128 is placed in its upper position under the biasing force of the coil spring 130, whereby the rod 118 of the transmitting member 116 is placed in an upper position thereof, to place the rotary valve 60 in one of the two operating positions for closing the first and second orifice passages 62, 64. When the negative pressure is applied to the lower chamber of the actuator 120, the output rod 128 is moved to its lower position by suction of the negative pressure against the biasing force of the coil spring 130, whereby the rod 118 of the transmitting member 116 is moved to a lower position thereof, so that the rotary valve 60 is rotated counterclockwise as seen in FIG. 1 and is placed in the other operating position for opening the first and second orifice passages 62, 64.

In the engine mount of the present embodiment, the rotary valve 60 is rotated between the above-described two operating positions as schematically shown in FIG. 11 for selectively enabling or disabling both of the first and second orifice passages 62, 64 simultaneously, by selectively connecting and disconnecting a negative pressure source to and from the actuator 120, to thereby change the damping characteristics of the engine mount as desired.

During running of the vehicle, the rotary valve 60 is placed in the operating position indicated by a phantom line in FIG. 11 for disabling both of the first and second orifice passages 62, 64, so as to effectively cause fluid flows through the third orifice passage 66, whereby the engine mount exhibits a damping effect with respect to the low-frequency vibrations such as engine shakes, on the basis of resonance of the fluid flowing through the third orifice 66. On the other hand, while the vehicle is in a stop with the engine placed in its idling state, the rotary valve 60 is placed in the other operating position indicated by a solid line in FIG. 11 for enabling both of the first and second orifice passages 62, 64, so as to cause fluid flows through the first and second orifice passages 62, 64, whereby the engine mount exhibits a damping effect with respect to engine idling vibrations, on the basis of resonance of the fluid flowing through the first and second orifice passages 62, 64. When the rotary valve 60 is placed in the operating position indicated by the solid line in FIG. 11, the third orifice passage 66 is also in communication with the equilibrium chamber 48. However, the third orifice passage 66 is substantially closed upon application of the engine idling vibrations since the third orifice passage 66 has the smaller A/L ratio of the cross sectional area to the length, than the first and second orifice passages 62, 64, and is tuned to damp the low-frequency vibrations.

In the engine mount constructed according to the present embodiment, the first orifice passage 62 is tuned to exhibit a high damping effect with respect to the component or components of the engine idling vibration which is/are different from that or those of the engine idling vibration to be effectively damped by the second orifice passage 64. Thus, the present engine mount is capable of exhibiting considerably high damping capability with respect to the engine idling vibrations generated while the vehicle is stationary with the engine in the idling state, as compared with the conventional engine mount having the orifice passage which is tuned to exhibit a damping effect with respect to the specific component of the engine idling vibration.

Figure 13:
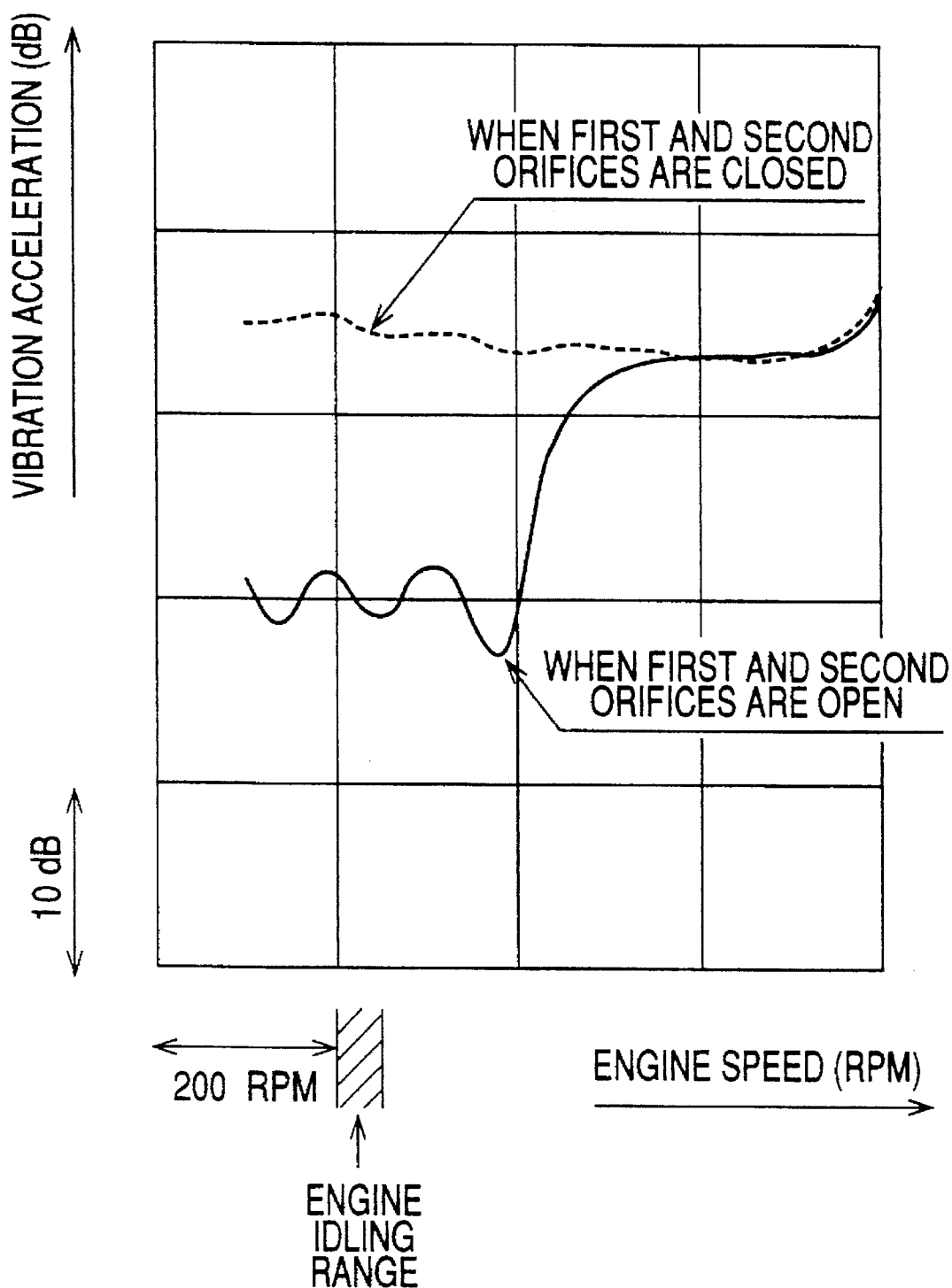
FIG. 13 is a graph showing the damping characteristics of the engine mount of FIG. 1 measured with respect to one component of the engine idling vibration.
Figure 14:
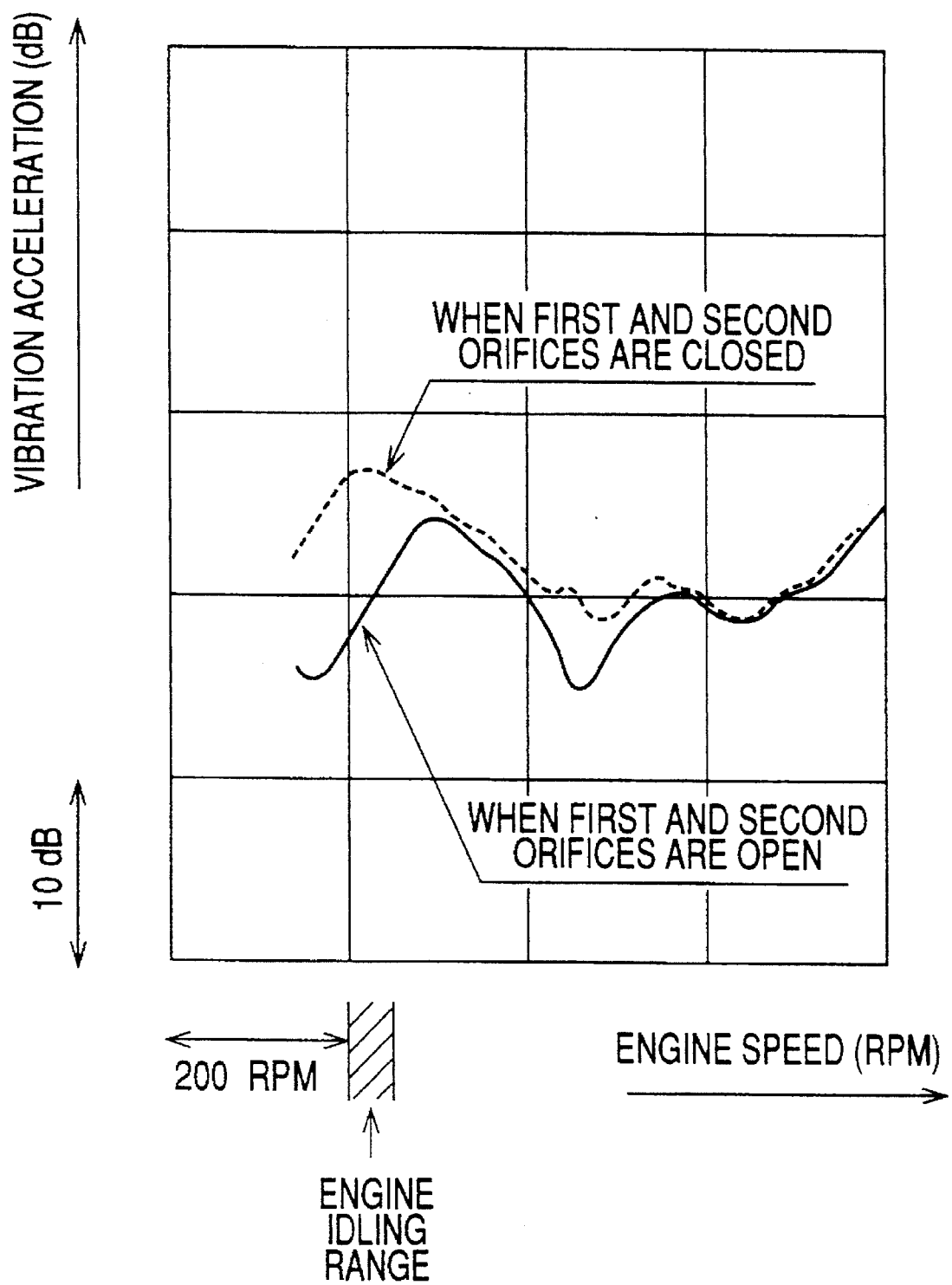
FIG. 14 is a graph showing the damping characteristics of the engine mount of FIG. 1 measured with respect to another component of the engine idling vibration.

Referring next to the graph of FIG. 12, there is shown a relationship between the absolute spring constant and the frequency of the input vibration, which was obtained in the engine mount constructed as described above. As is apparent from the graph of FIG. 12, the engine mount exhibited low spring constants in the frequency ranges indicated by "A" and "B" in the graph, based on resonance of the fluid flows through the first and second orifice passages 62, 64, respectively. Referring to the graphs of FIGS. 13 and 14, there are shown results of tests effected on the present engine mount installed on the vehicle, so as to obtain relationships between the engine speed and the vibration acceleration, when the engine mount was subjected to different components of the engine idling vibrations, namely, the component whose vibration level is the highest (FIG. 13), and the component whose vibration level is the second highest (FIG. 14). In each of the tests, the relationship was obtained when the first and second orifice passages 62, 64 are closed for inhibiting the fluid communication between the pressure-receiving and equilibrium chambers 46, 48 through these orifices 62, 64 (as indicated by dashed lines in the graphs of FIGS. 13 and 14), and when these orifice passages 62, 64 are open for permitting the fluid communication therethrough (as indicated by solid lines in the same). It is recognized from the results of the graphs of FIGS. 13 and 14 that the engine mount constructed according to the present embodiment exhibited effective damping characteristics with respect to the two different-order components of the engine idling vibrations.

In the engine mount constructed as described above, the partition plate 41 is placed on the partition member 40, and the first, second and third grooves 74, 76, 78 formed in the upper surface of the partition member 40 are covered by the partition plate 41, to respectively provide the first, second and third orifice passages 62, 64, 66. Thus, these orifice passages 62, 64, 66 are defined by simple construction.

In the present engine mount, the rotary valve 60 adapted to selectively open and close the first and second orifice passages 62, 64 is accommodated in the valve hole 58 which is formed in the central portion of the partition member 40. In this arrangement, the output rod 128 of the actuator 120 by which the driving force for driving the rotary valve 60 is transmitted thereto is disposed in substantially coaxial relation with the rod 118 of the transmitting member 116 linked with the rotary valve 60. Accordingly, the actuator 120 can be positioned coaxially with the center axis of the engine mount, to thereby assure a reduced space for installing the engine mount including the actuator 120. The first orifice passage 62 is open in a portion of the outer surface of the partition member 40 which portion is offset from a portion of the same in which the rotary valve 60 is disposed. Further, the first orifice passage 62 formed within the partition member 40 is located on one side of the rotary valve 60 such that the passage 62 extends in the circumferential direction of the partition member 40, so as to provide a tunnel-like structure. According to this arrangement, the first orifice passage 62 can be formed with a sufficient length through the partition member 40.

In the present engine mount, the point of connection of the rod 118 of the transmitting member 116 to the rotary valve 60 is offset a suitable distance from the axis of rotation of the rotary valve 60 in the radial direction, so that the reciprocating movement of the output rod 118 can be converted into the rotary movement of the rotary valve 60. Accordingly, the number of components of the mechanism for operating the rotary valve 60 can be made relatively small, and the mechanism can be simplified in construction.

While the present invention has been described above in detail in its preferred embodiment, it is to be understood that the invention is not limited to the details of the illustrated embodiment, but may be otherwise embodied.

For instance, the configurations of the first and second orifice passages 62, 64 are not limited to the details of the illustrated embodiment, but may be modified as needed depending upon the desired damping characteristics, construction and size of a fluid-filled elastic mount. In particular, the configurations and structures of the first and second orifice passages 62, 64 may be suitably modified so that these orifices 62, 64 have the desired lengths and cross sectional areas depending upon frequency values of various components of the engine idling vibrations to be damped.

Figure 15:
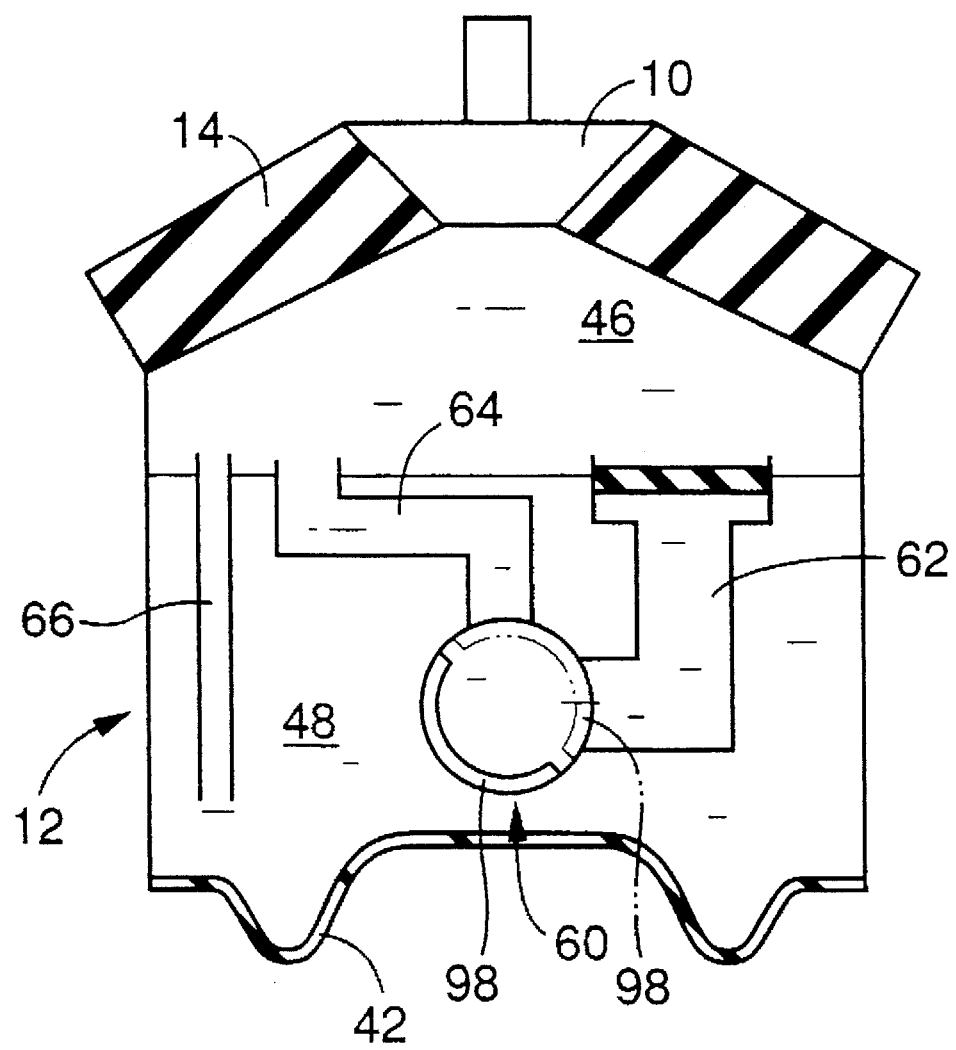
FIG. 15 is a view schematically showing a construction of the engine mount according to another embodiment of the invention.

In the illustrated embodiment, the third orifice passage 66 is connected in series with the second orifice passage 64. However, the second and third orifice passages 64, 66 may be formed independently of each other, as shown in the schematic view of FIG. 15. Alternatively, the third orifice passage 66 connected in series with the second orifice passage 64 may be provided within the valve means, together with the second orifice passage 64.

In the illustrated embodiment, the flexible rubber layer 94 is disposed as a movable or deformable member which partially defines the first orifice passage 62 and undergoes oscillatory movements with the elastic deformation thereof, so as to permit substantial flows of the fluid in the passage 62. However, the flexible rubber layer 94 may be replaced with a movable plate which is disposed within the recess 68 such that it is movable over a predetermined distance in the axial direction within the recess 68 for permitting substantial fluid flows in the first orifice passage 62 based on the axial displacement.

The valve means is not limited to the rotary valve of the illustrated embodiment. Any known valve means may be employed, provided that it is capable of selectively permitting and inhibiting the fluid flows in the first and second orifice passages 62, 64.

Where the rotary valve 60 of the illustrated embodiment is used as the valve means, the actuator 120 of the pneumatically operated diaphragm type may be replaced with any other known types of the actuator such as a solenoid-operated type or electromagnetically operated type. Such actuator may be positioned within the elastic mount such that it is offset from the axis of the elastic mount, or such that it projects in the radial direction of the elastic mount, depending upon the construction and installation position and space of the elastic mount.

The principle of the present invention may also be applicable to a cylindrical engine mount suitably used for front engine front drive vehicles, wherein a center shaft as the first mounting member and an outer cylindrical member as the second mounting member are disposed in a radially spaced-apart relation with each other and are elastically connected to each other by the elastic body interposed therebetween.

It is to be understood that the present invention may be embodied with various other changes, modifications and improvements, which may occur to those skilled in the art, without departing from the spirit and scope of the invention defined in the following claims.

What is claimed is:

1. A fluid-filled elastic engine mount for a motor vehicle having an engine, comprising:

a first and a second mounting member which are spaced apart from each other;

an elastic body which elastically connects said first and second mounting members and which partially defines a pressure-receiving chamber which is filled with a non-compressible fluid and whose pressure changes upon application of a vibrational load to said engine mount;

a flexible diaphragm member which partially defines an equilibrium chamber filled with said fluid, said flexible diaphragm member being displaceable to permit a change in a volume of said equilibrium chamber;

orifice means for effecting fluid communication between said pressure-receiving and said equilibrium chambers;

said orifice means defining a first orifice passage and a second orifice passage which are respectively tuned to adjust respective different components of idling vibrations of said engine, and a third orifice passage which is tuned to a frequency range which is lower than that of said idling vibrations of the engine;

said orifice means comprising a movable member which partially defines one of said first and second orifice passages which is tuned to adjust one of said different components of said idling vibration whose frequency is higher than the other of said different components, said movable member restricting an amount of flow of fluid through said one of said first and second orifice passages; and valve means for selectively enabling or disabling both of said first and said second orifice passages simultaneously for permitting or inhibiting said fluid communication between said pressure-receiving and said equilibrium chambers.

2. A fluid-filled elastic engine mount according to claim 1, wherein said orifice means further comprises a partition member which is supported by said second mounting member and which partially defines said pressure-receiving and equilibrium chambers on opposite sides thereof, respectively, said partition member having grooves open in an upper surface of said partition member; and a partition plate placed on said upper surface of said partition member so as to close openings of said grooves, for providing said second and third orifice passages, respectively, and wherein said first orifice passage is formed through said partition member and is open at one end thereof in said upper surface of said partition member, said movable member defining an end portion of said first orifice passage which is open in said upper surface of said partition member.

3. A fluid-filled elastic engine mount according to claim 2, wherein said partition member has a valve hole formed in a central portion thereof, and said valve means comprises a rotary valve which is disposed within said valve hole such that an axis of said rotary valve extends in a radial direction perpendicular to an axial direction in which said pressure-receiving and equilibrium chambers are spaced from each other, said end portion of said first orifice passage being offset from said central portion of said partition member in said radial direction.

4. A fluid-filled elastic engine mount according to claim 3, wherein said rotary valve comprises: a first and a second cylindrical bearing portion rotatable about said axis of said rotary valve in sliding contact with a sliding surface of said valve hole in said partition member; a valve portion consisting of an arcuate portion corresponding to a predetermined portion of an entire circumference of said rotary valve, said valve portion extending in the axial direction of said rotary valve so as to connect said pair of cylindrical bearing portions to each other; a cutout corresponding to susbstantially the remainder of said entire circumference of said rotary valve and communicating with said equilibrium chamber; a communication hole formed through a peripheral wall of said first cylindrical bearing portion; a drive disc provided at one axial open end of said second cylindrical bearing portion adjacent to said valve portion; and a positioning projection which is provided at the other axial open end of said second cylindrical bearing portion so as to extend axially outwardly of said second cylindrical portion.

5. A fluid-filled elastic engine mount according to claim 4, wherein said first orifice passage is open at the other end thereof on said sliding surface of said rotary valve for fluid communication with said equilibrium chamber.

6. A fluid-filled elastic engine mount according to claim 4, wherein said partition member further comprises an abutting projection formed at one of opposite axial ends of said rotary valve so as to protrude radially inwardly of said rotary valve.

7. A fluid-filled elastic engine mount according to claim 6, wherein said positioning projection of said rotary valve cooperates with said abutting projection of said partition member to define two operating positions of said rotary valve.

8. A fluid-filled elastic engine mount according to claim 1, wherein said third orifice passage is connected at one end thereof to said second orifice passage, so that said third orifice passage is held in communication with said pressure-receiving and equilibrium chambers via said second orifice passage.

9. A fluid-filled elastic engine mount according to claim 4, further comprising a motion converting mechanism for converting a reciprocating movement into a rotary movement of said rotary valve, said motion converting mechanism including a rod which is connected at one of opposite ends thereof to said rotary valve at a portion which is offset from said axis of said rotary valve in a radial direction of said rotary valve said rod extending into said equilibrium chamber through a window formed in said partition member in alignment with said cutout of said rotary valve.

10. A fluid-filled elastic engine mount according to claim 9, wherein said rod of said motion converting mechanism is connected at the other of said opposite ends thereof to an output rod of an actuator which is operated by application of a reduced pressure thereto such that said rotary valve is placed in one of two operating positions thereof for simultaneously disabling said first and second orifice passages.

* * * * *

UNITED STATES PATENT AND TRADEMARK OFFICE
CERTIFICATE OF CORRECTION

PATENT NO. : 5,639,073
DATED : June 17, 1997
INVENTOR(S) : Tatsuya SUZUKI, Rentaro KATO, Tetsuo MIKASA, Shuji OHTAKE and Atsushi SAKAMOTO It is certified that error appears in the above-indentified patent and that said Letters Patent is hereby corrected as shown below:

On the title page, :
In item [73] of page 1, please insert --Honda Giken Kogyo Kabushiki Kaisha, Tokyo, Japan-- after "Tokai Rubber Industries, Ltd., Aichi-ken, Japan"

Signed and Sealed this

Twenty-fourth Day of March, 1998

*Attest:*

BRUCE LEHMAN

*Attesting Officer*      *Commissioner of Patents and Trademarks*